March 25, 1969

C. A. BODGE 3,435,293

APPARATUS FOR PROVIDING INSTANTANEOUS OVERLOAD PROTECTION
ESPECIALLY USEFUL IN PROTECTING SEMICONDUCTIVE DEVICES

Filed Dec. 30, 1965

INVENTOR
Clifford A. Bodge

BY John C. Haug
ATTORNEY

United States Patent Office 3,435,293
Patented Mar. 25, 1969

3,435,293
APPARATUS FOR PROVIDING INSTANTANEOUS OVERLOAD PROTECTION ESPECIALLY USEFUL IN PROTECTING SEMICONDUCTIVE DEVICES
Clifford A. Bodge, Attleboro, Mass., assignor to Texas Instruments Incorporated, Dallas, Tex., a corporation of Delaware
Filed Dec. 30, 1965, Ser. No. 517,633
Int. Cl. H02h 3/28
U.S. Cl. 317—31                                7 Claims

ABSTRACT OF THE DISCLOSURE

Current and voltage overload protection apparatus for load circuits having semiconductors therein including a conventional magnetic circuit breaker used in conjunction with means providing instantaneous protection including the following embodiments, the first employs a voltage diode in parallel with the circuit breaker coil resulting in a constant time delay breaker, the second employs a negative coefficient thermistor in series with the circuit breaker coil to provide compensation for changes in coil resistance due to heating, and a third uses a semiconductor rectifier (SCR) in parallel with the load. A magneto resistor may be used in the embodiment to reduce power consumption and excessive voltage drop.

This invention relates to overload protectors and more particularly to means for protecting semiconductor equipment and the like from excessive voltage, currents and the like.

One of the numerous causes of failure of electrical equipment having semiconductors therein is excessive current and over-voltage. Most failures are actually a result of excessive temperature which is brought about by excessive currents through the components, the excessive current either shorting out the component or causing serious degradation thereof. Excessive currents generally result from voltage surges or overvoltages which occur in the power supplies for the equipment. Small signal transistors are damaged when subjected to voltage overcurrents lasting for only a few microseconds. Electromechanical and thermal type circuit protectors do not react with sufficient speed to protect the semiconductor devices from transients which last for such short periods of time. Therefore, it is one object of this invention to provide a means for providing overload protection for equipment against overloads lasting only for a few microseconds.

It is another object of the invention to provide a combination instantaneous protection against voltage surges while other conventional types of overload protectors have time to open the circuit.

Still another object of the invention is to provide a protective circuit to prevent the application of voltages to equipment for excessive lengths of time.

It is still another object of the invention to provide protection against voltage or current overloads which will react faster than most electro-mechanical protecting devices.

Other objects and features of the invention will be apparent from the following detailed description taken in conjunction with the appended claims and attached drawing in which:

Figure 1:
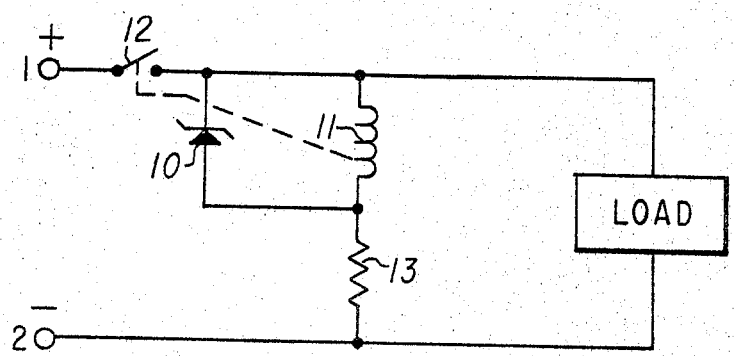
FIGURE 1 is an overload protection circuit including the combination of electro-mechanical circuit breaker and a voltage regulator diode.

It is often desirable not only to protect continuously operating circuits against surges of voltage or over-current, but also to protect circuits which are to be operated for only short periods of time against the application of voltages for times in excess of the desired period, or in excess of a maximum length of time beyond which would possibly cause harm to the circuit or to the power source supplying power to a load. Shown in FIGURE 1 is a circuit in which a constant operating time is maintained over a range of applied voltages which includes a voltage calibrated magnetic circuit breaker. Systems which use voltage calibrated magnetic circuit breakers for overload protection often require these devices to operate at a fixed time delay. Since the hydraulic magnetic sensing mechanism used in a magnetic circuit breaker provides an inverse time delay, it is necessary to maintain the applied voltage at a constant value. The circuit in FIGURE 1 comprises a voltage regulator diode and a resistor in conjunction with a voltage calibrated circuit breaker. In FIGURE 1, the coil 11 of the magnetic circuit breaker is in series with the resistor 13 across the load, which is also across the input terminals 1 and 2. The resistor 13 is used to dissipate excess energy over that required to operate the circuit breaker. In parallel with the coil 11 of the circuit breaker is the voltage regulator diode 10. A voltage regulator diode is a commercially available device and is commonly known as a "Zener" diode which has the characteristics that as long as the voltage applied across the diode is below its "Zener" voltage there will be essentially no conduction through the diode. However, once the voltage exceeds the breakdown or Zener voltage of the diode, the diode commences to conduct and the voltage across the diode will be maintained at the Zener voltage as long as the operating ratings of the diode are not exceeded. A typical example of a constant time delay circuit breaker may be one for which a constant time delay of approximately 60 seconds is desired over an operating range of 5–12 volts D.C. A suitable magnetic circuit breaker may be a type 2MC which is manufactured by Metals & Controls Inc., Attleboro, Mass., shown and described in copending application, Ser. No. 298,536, filed July 26, 1963, entitled "Magnetic Type Circuit Breaker." A typical use for the constant time delay circuit may be in a starting circuit wherein it is desired to apply, for example, a voltage to a circuit for a fixed period of time. After the lapse of the fixed period of time, the breaker will be actuated opening contact 12 thereby removing the voltage from the load. By maintaining a constant voltage across the coil of the magnetic circuit breaker over the period of operation, the magnetic circuit breaker will always operate in the same time period. A typical circuit would be as follows, wherein $V_s$ is a system voltage (5–12 volts DC)
$V_r$ is the voltage across the resistor 13
$V_{cb}$ is the voltage across the circuit breaker coil 11
$V_z$ is a breakdown voltage of diode 10.

If $V_{cb}$ is selected to be 4 volts and $V_z$ is selected to be 5 and the time delay mechanism in the circuit breaker is designed so as to produce a time delay of 60 seconds at 5 volts, then resistor 13 will be selected so that 4 volts will be applied to coil 11 and 1 volt across the resistor 13. The coil current required to operate at 4 volts may be for example about .63 amp, therefore the resistance of resistor 13 is equal to 1 divided by .63 amp=1.6 ohms. To achieve this with the system at 12 volts, the following calculations show the various voltages and currents and resistance throughout the circuit.

$$V_{cb}=V_z=5V$$
$$V_R=7v$$
$$1_r=\frac{7}{1.6}=4.4 \text{ amps}$$
$$I_r=I_z+I_{cb}$$
$$R_{cb}=\frac{4}{.63}=6.35 \text{ ohms}$$

at $$5V_{Icb}=\frac{4}{6.35}=0.79 \text{ amp}$$
$$I_z=I_r-I_{cb}=4.4-0.79=3.61 \text{ amps}$$

The power dissipation in the diode 10 is a maximum at 12 volts, taking the current through the Zener calculated above, the power rating of the diode may be determined $$-P_z=3.61\times5=18 \text{ watts}$$

The power rating of the diode is dependent on the duty cycle of the system and in the particular design shown above, a duty factor less than 40% will allow the use of a 10 watt diode rating.

When it is necessary to have the switching of the circuit breaker within required tolerance, it is necessary to compensate for the change in coil resistance due to heating created by the current passing through the coil. It has been found that as much as 18% variation is caused due to the temperature effect on the resistance of the coil. To alleviate this situation, the current through the coil must be kept relatively constant upon the application of a voltage, otherwise an 18% difference in the calibration will be brought about between the "trip" voltage slowly applied and the "trip" voltage instantaneously applied.

Figure 2:
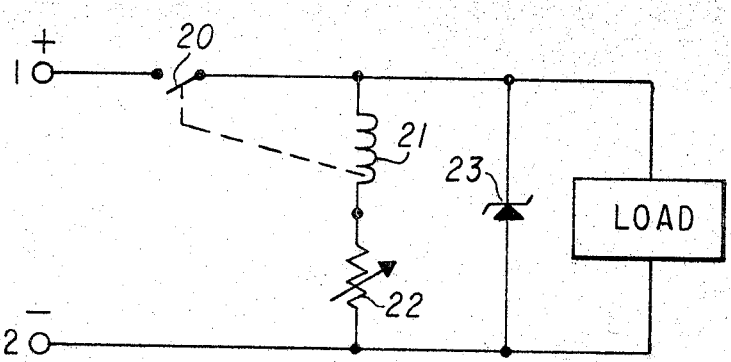
FIGURE 2 is a circuit diagram of a protector circuit including the combination of an electro-mechanical circuit breaker and a temperature variable resistor and a voltage regulator diode.

A circuit taking into consideration the heating effect of the current through the coil is shown in FIGURE 2. Coil 21 of the circuit breaker has a heat sensitive resistor 22 connected in series. A suitable device is a negative coefficient thermistor. Since the thermistor has a characteristic that the resistance decreases as the current and temperature increase the thermistor will offset the increase of resistance of the coil 21 as current heats the coil up. Connected in parallel with the coil and thermistor circuit is the diode 23. Diode 23 breaks down when the voltage exceeds a certain level, thereby protecting against short transients or overloads and protects the load until the circuit breaker has time to be actuated. Upon the actuation of the circuit breaker, contacts 20 open, removing the power from the load. The operation of this circuit may be similar to that shown in FIGURE 1 where the duration of the applied power is desired to be for a certain period of time, or the circuit breaker may be of the type that will not be actuated unless a sustained overload occurs over a period of time, thereby permitting power to be supplied continuously to the load unless a large overvoltage is applied. Normal application of operating voltages will not actuate the circuit breaker.

By using a thermistor 22 in series with the coil 21 it has been found that the percent change in current due to the heating effect was found to be about 3.16% as compared with the 18% measured without the thermistor in the circuit.

The thermistor is placed within the circuit breaker housing and in close proximity to the coil so that the thermistor may react not only to the heat caused by the current through the thermistor but also to the heat generated within the coil. It should be noted that in each of the circuits illustrated herein the circuitry is enclosed within the circuit breaker housing, thereby providing a package no larger than the actual circuit breaker package itself.

Figure 3:
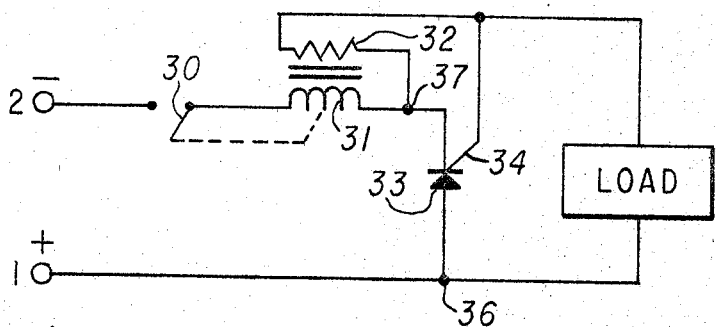
FIGURE 3 is another embodiment of the invention which comprises an electro-mechanical circuit breaker, a semiconductor controlled rectifier, and a resistor.

FIGURE 3 illustrates a protective circuit using a semiconductor controlled rectifier which fires when the applied voltage exceeds a certain rated level. Winding 31 is the coil of a magnetic circuit breaker which has contacts 30. Upon the actuation of the circuit breaker, contacts 30 open removing the power applied to the load. During normal operation, current will flow through contact 30, coil 31, resistor 32 and the load. Resistor 32 may be a magneto resistor which has a characteristic of increasing its resistance as the applied magnetic field is increased. During normal operation this characteristic causes a reduction in the power consumption in the resistor and hence prevents excessive voltage drop. Normal rated current to the load will not actuate the magnetic circuit breaker. During normal operation the semi-conductor control rectifier 33 will not be in a conducting state. As current through resistor 32 increases above the normal rated value due to an increase in applied voltage, the voltage drop across resistor 32 will increase as the voltage increases, a positive voltage will be applied to gate 34 of SCR 33. When the voltage at gate 34 reaches a predetermined value, semiconductor control rectifier 33 will commence to conduct, thereby increasing the current through coil 31 thereby actuating the circuit breaker. Conduction of the controlled rectifier 33 applies a very low resistance path between points 36 and 37 which is directly across the power input terminals, thereby removing the voltage from the load and actuating the circuit breaker. This circuit has the advantage over those shown in FIGURES 1 and 2 of not consuming as much power during normal operation as the others. This results from the fact that there is no circuit across the line which is conducting during normal operation. This particular circuit may be used to protect against sudden overloads, but due to the circuit configuration it is not particularly suited to limit the time a certain voltage is applied as the circuits of FIGURES 1 and 2 may be used.

It is to be understood that the form of the invention herein shown and described is to be taken as a preferred example and that various modifications may be made without departing from the spirit and scope of the invention as defined by the appended claims.

What is claimed is:

1. Equipment overload protective apparatus for limiting the duration of application of a voltage source to a load and having a constant operating time comprising in combination: a first circuit means including a voltage regulator which conducts current when the voltage impressed on it is in excess of a rated value, the regulator is connected in parallel with the load intermediate the voltage source and the load to maintain the voltage across the load at a constant value when the regulator is conducting and which is reactive to an instantaneous voltage impulse in excess of the rated value; and a second circuit means including a magnetic circuit breaker having a coil connected in parallel with the regulator and reactive to the voltage impulse at a lower rate than said first circuit means; and a resistor element in series with the coil, the first circuit means providing overload protection until the second circuit means, which always operates in the same time period, disconnects the equipment from the voltage source.

2. An overload protection means to limit the duration of application of a voltage source to a load comprising in combination: a first circuit means connected in parallel with said load intermediate said source and said load to maintain the applied voltage at a predetermined value, a switch means connected in series with said load connecting said load with said voltage source when said switch means is in a closed state, a second circuit means connected in parallel with said first circuit means intermediate said source and said first circuit means responsive to the applied voltage to actuate said switch means after a predetermined time and a resistor element placed in series with the second circuit means to reduce the voltage applied to the second circuit means.

3. The overload protection means defined in claim 2 wherein said first circuit means is a breakdown diode and said second circuit means is a magnetic circuit breaker.

4. An overload protection means to limit the duration of application of a voltage source to a load comprising in combination: a first circuit means connected in parallel with said load to maintain the applied voltage at a predetermined value, a switch means connected in series with said load connecting said load with said voltage source when said switch means is in a closed state, a second circuit means connected in parallel with said first circuit means responsive to the applied voltage to actuate said switch means after a predetermined time and a heat sensitive resistor having a negative coefficient of resistance which is connected in series with said second circuit means to compensate for changes in resistance of said second circuit means due to changes in temperature.

5. A circuit means for preventing the application of excessive voltage and current to electrical apparatus comprising in combination, a circuit breaker means connected in series with said electrical equipment, a resistive element connected in series with said circuit breaker means, and a semiconductor control rectifier connected in parallel with said electrical equipment, the emitter of said semiconductor control rectifier being connected at a point common to said circuit breaker means and said resistive element and the gate of said semiconductor control rectifier connected to the side of said resistive element opposite said common point.

6. A circuit means defined in claim 5 wherein said circuit breaker means includes a pair of contacts connected in series with said electrical equipment and said resistor, said contacts being actuated in response to conduction by said semiconductor control rectifier resulting from an increase of voltage across said resistive element.

7. A circuit means according to claim 5 in which the said resistive element is a magneto resistor.

References Cited

UNITED STATES PATENTS

| | | | |
|---|---|---|---|
| 2,991,396 | 7/1961 | Schurr | 317—11 |
| 3,242,383 | 3/1966 | Opad | 317—31 X |
| 3,286,131 | 11/1966 | Myers | 317—31 X |

JOHN F. COUCH, *Primary Examiner.*

R. V. LUPO, *Assistant Examiner.*

U.S. Cl. X.R.

317—33, 36, 38